3,702,842
COPOLYMERS FROM PARA TERTIARY BUTYL STYRENE AND DIISOBUTYLENE AND METHOD FOR PRODUCING SAME
Bernard J. Davis, Biloxi, and Wesley J. Ranson, Gulfport, Miss., assignors to Reichhold Chemicals, Inc., White Plains, N.Y.
No Drawing. Filed Sept. 17, 1971, Ser. No. 181,593
Int. Cl. C08f 19/04
U.S. Cl. 260—88.2 C   10 Claims

ABSTRACT OF THE DISCLOSURE

Resinous copolymers of para tertiary butyl styrene and diisobutylene are prepared by reacting (A) para tertiary butyl styrene and (B) diisobutylene in the presence of a Friedel-Crafts catalyst at a temperature ranging from about 0° C. to about 70° C. and recovering the resinous copolymers. These resinous copolymers are colorless, and have softening points up to about 140° C. and are soluble down to about 0° C. in odorless low Kouri Butnol (KB) value solvents.

---

The invention relates to resinous copolymers of para tertiary butyl styrene and diisobutylene and to their method of production.

More specifically the invention relates to the preparation of resinous copolymers of para tertiary butyl styrene and diisobutylene by reacting (A) para tertiary butyl styrene and (B) diisobutylene in the presence of a Friedel-Crafts catalyst at a temperature ranging from about 0° C. to about 70° C. and recovering these resinous copolymers. These resinous copolymers are colorless, and have softening points up to about 140° C. and are soluble down to about 0° C. in odorless low-Kauri Butanol (KB) value solvents.

The primary object of the invention is to provide hard copolymers of para tertiary butyl styrene and alpha methyl styrene, said copolymers being water white in color; of excellent solubility in a variety of solvents, particularly in extremely low solvency hydrocarbon solvents, independent of the melting point of the resin. Such solubility characteristics are demonstrated at low, ambient and high temperatures; the copolymers are easily prepared and may vary in melting points from viscous liquids to hard friable solids with a melting point of about 140° C.

Another object of this invention is to provide such polymers that are characterized by low hot melt viscosities, are completely compatible with high and low molecular weight polyethylene, polypropylene, ethylene-vinyl acetate copolymers and material and synthetic rubber and paraffin wax.

A further object is to provide a method for producing such polymers in accordance with the foregoing object that is simple, and practical, resulting in excellent yields and amendable to batch or continuous processing.

The copolymers of this invention are preferably formed by contacting the para-tertiary butyl styrene and diisobutylene with boron trifluoride. Other catalysts such as boron trifluoride etherate, phosphorus penta fluoride, aluminum chloride, aluminum bromide, stannic chloride, alkyl stannic chloride, cadmium oxychloride, vanadium chloride or any Friedel-Crafts catalyst or mixtures thereof may be employed. For most purposes, it is preferred that the reactants be employed in the ratio of from about 95% to about 55% para tertiary butyl styrene to about 5% to about 45% diisobutylene, because this represents the ratio of monomer feed that analysis demonstrates to be present in a final polymer. Higher ratios of para tertiary butyl styrene tend to produce linear blocks of this monomer which is detrimental to the utility of the resultant polymers. The proportion of about 90% to about 60% para tertiary butyl styrene to about 10% to about 40% diisobutylene result in copolymers of optimum freedom from color, odor, excellent solubility and compatibility particularly with paraffin waxes, and insures excellent yields.

The character of the polymer, particularly the resulting melt point may be controlled by various ways. For example, the high exothermic reaction may be moderated by use of an inert organic diluent as a reaction medium. Such inert solvents may be lower molecular weight aromatics such as benzene, toluene, xylene, or higher molecular weight aromatics including those prepared from petroleum and marketed under the trade name "Solvesso," such as Solvesso 100 or Solvesso 150, or they may be aliphatic solvents, naphthas or mixtures such as VM&P Naphtha or mineral spirits or mixtures of any of the foregoing. It has been found that the use of aliphatic solvents such as heptane provide slightly higher melt point resins than do aromatics. "Solvesso" is a trademark for well known commercially available products referred to in Reinhold's "The Condensed Chemical Dictionary, 6th edition" on page 1061 and such products are aromatic solvents prepared from petroleum.

The character of the resin may also be varied by control of the reaction temperature through use of external cooling or reflux cooling at various levels during the reaction.

In general, at any given temperature, the higher the concentration of the reactants the lower the softening point, the higher the concentration of catalyst the lower the softening point and the higher the ratio of para tertiary butyl styrene the higher the softening point. At uniform concentrations of reactants and catalyst the lower the reaction temperature the higher the softening point.

The following tables, Table I and Table II, illustrate some of these relationships. In Table I the reaction temperature was 5° C., the catalyst used was 0.1% boron trifluoride gas based upon the weight of the monomers, and the reaction was run at 50% monomer concentration in dry heptane. These conditions were the same for each example only the percent of diisobutylene was varied.

TABLE I

| Percent diisobutylene | Percent p-t-butyl styrene | Softening point, ° C. |
|---|---|---|
| 0 | 100 | 150 |
| 10 | 90 | 130 |
| 20 | 80 | 120 |
| 30 | 70 | 100 |
| 40 | 60 | 80 |

In Table II reaction parameters were fixed at a 10% diisobutylene-90% para tertiary butyl styrene monomer ratio, the catalyst used was 0.1% boron trifluoride gas, based upon the weight of the monomers and the reaction was run at 50% monomer concentration in dry heptane. Only the reaction temperature was varied.

TABLE II

| Reaction temperature, ° C.: | Softening point, ° C. |
|---|---|
| 0 | 140 |
| 10 | 120 |
| 20 | 105 |
| 30 | 90 |
| 40 | 80 |
| 50 | 70 |
| 60 | 60 |
| 70 | 50 |

Direct addition of catalyst to the monomer-solvent mixture provides about 5° C. higher melting points as compared to addition of the monomer mix to the solvent-catalyst mix at the same temperature. By such controls, resins can be produced with softening points ranging from viscous liquids to hard friable solids of about 140° C.

In the preferred practice of this invention, boron trifluoride gas is bubbled into the solution of the monomers. Although for most purposes 0.05 to 0.1 percent by weight based on the monomers suffices, larger amount may be employed up to about 1.0%, though economy and ease of removal dictate an upper practical limit of about 0.3%. Inverse addition may also be employed if so desired. If a liquified catalyst is preferred, any catalytic addition compound of $BF_3$ such as the etherate may be employed. The temperature of the reaction is controlled by external cooling. The temperature may range from about 0° C. to about 70° C. However the preferred reaction temperature is between 10° C. and 30° C., because outstanding results are achieved therefrom.

The solvents employed should be free of dissolved solids, olefins and water to get maximum reaction efficiency and clarity of product. Similarly, the monomers should be polymer free and contain no more than 50 p.p.m. water.

The resinous copolymers produced in the reaction are recovered by various methods that are conventionally practical in the art. Thus, the $BF_3$ is neutralized with hydrated lime or lime and a clay such as attapulgus clay or fuller's earth. About 0.1% of lime and 0.1% clay is required based on the monomer weight, where 0.05% $BF_3$ is employed. Thus the amount of clay and lime can be varied in direct proportion to the amount of catalyst employed. In this practice, the lime is added first, then the clay and the mixture heated to 80–85° C. and held at this temperature for ½ hour. The mixture is then filtered. The filtrate is then inert gas sparged to 220° C. and steam distilled to 250° C. Steaming is continued until a water to oil ratio coming through the condenser is 25:1.

In this manner a crystal clear, white resin is produced that is soluble in extremely low solvency solvents down to a temperature of about 0° C. The resins of this invention differ from those now practical in the art by virtue of the fact that the resins of this invention exhibit such solvency independent of their melting point, while those currently practiced in the art are only soluble in extremely low KB solvents under the aforementioned conditions with a melt point not higher than 100° C. Such extremely low solvency solvents are hexane, heptane, odorless mineral spirits and Isopar solvents as marketed by Standard Oil of New Jersey. Such solvents have a Kauri Butanol (KB) value of 27. Resins of this invention ranging in melting point from viscous liquids to solids of about 140° C. are completely soluble and retain solvency in such solvents down to about 0° C. Resins currently practiced in the art claim solubility at higher melting points up to 130° C. in so-called low odor solvents. These are reduced odor mineral spirits, not odorless mineral spirits, and they have Kauri Butanol values ranging from 32 to 35; hence some aromatics are necessary to dissolve these resins that are not necessary for stable solutions of the resins of this invention.

These resins are unique in that they exhibit this solubility characteristic independent of melt point and are compatible with a broad range of polymers, making them useful in hot melt coatings based on waxes and polymers such as ethylene-vinyl acetate copolymers, waxes and polyethylene, waxes and polypropylene; in pressure sensitive tape systems requiring high efficiency and outstanding color stability; as color stable modifiers for polyethylene and polypropylene film; and as a component in printing inks and coatings.

The following examples are meant to illustrate this invention and not to limit each in its broadest scope.

EXAMPLE I

To a 3-liter flask equipped with stirrer, reflux, gas inlet, thermometer and cooling jacket was charged one mole (160 grams) para tertiary butyl styrene and one mole (112 grams) diisobutylene, both monomers previously being redistilled. To this mixture was added 272 grams dry heptane and the blend cooled under nitrogen to a temperature of 15° C. 0.1% $BF_3$ gas was slowly added at such a rate as to maintain a reaction temperature of 20° C. with the aid of a cooling bath. When the $BF_3$ addition was complete, the reaction was maintained at 20° C. for two hours. The reaction mass was then heated to 80° C. and 0.2% lime was added followed by 0.2% attapulgus clay. The mixture was held at 85° C. for one-half hour and filtered. The filtrate was nitrogen sparged to a temperature of 220° C. then steam sparged to 250° C. and held at 250° C. with steaming until a condensate ratio of 25 water to 1 oil was attained. The product was then poured. Yield of resin was 82% based on monomers, color was water white, melting point 70° C. (ball and ring). The resin was soluble in hexane and Isopar K (27 KB) at 0° C. and provided excellent pressure sensitive tape when tested in a standard SBR rubber type formulation. The resin was completely compatible with ethylene vinyl acetate copolymer, paraffin wax, polyethylene and polypropylene.

Isopar K is manufactured by Humble Oil & Refining Co. It is an iso-paraffinic hydrocarbon having an aniline point of 185° F., a KB value of 27, a viscosity, cps. at 25° C., of 1.358 and a boiling range from 349° to 383° F.

EXAMPLE II

The same procedure was employed as shown in Example I except that two moles of para tertiary butyl styrene was reacted with one mole of diisobutylene. Yield obtained was 90%, melt point 100° C., color water white, with equal solubility and compatibility.

EXAMPLE III

The same procedure was employed as shown in Example I except that three moles para tertiary butyl styrene was reacted with one mole diisobutylene. Yield obtained was 97%, melting point 130° C., color water white, with equal solubility and compatibility.

The following table (Table III) demonstrates the efficiency of a typical resin of this invention in pressure sensitive adhesive systems. In adhesive systems based on natural rubber, the resins of this invention provide better tack and tack retention, better peel strength and better creep characteristics (see test procedures in "Pressure Sensitive Tape Council," 5th edition) than do comparative resins used in adhesive systems even after exposure to U.V. light.

The standard formula employed in preparing the adhesives was as follows:

|  | Pts. by wt. |
| --- | --- |
| Natural rubber | 40.0 |
| Antioxidant (Cyanamid 2246) [1] | 0.4 |
| Resin under test | 36.0 |
| Toluene | 26.0 |
| Hexane | 160.0 |

[1] Cyanamid 2246 is:

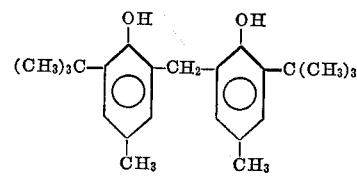

The adhesives were coated on masking tape grade paper with a wet thickness of 0.025 inch. The resultant dry coating was between 0.0013 and 0.0016 inch thick.

The adhesives were tested for peel (grams/180° at 12 inches per minute), tack (inches of rolling ball) and creep (minutes for 1 square inch/1 lb./weight at 140° F.). Tack, peel and creep were also tested after 10 and 15 hours U.V. exposure at 24 inches distance with a Westinghouse Sun Lamp 275W.

TABLE III

| | Resin[1] | 50/50 copolymer styrene-para tertiary butyl styrene | Para tertiary butyl styrene |
|---|---|---|---|
| Initial tack | .3 | 3.2 | ([2]) |
| After 10 hours UV | .3 | 4.5 | F |
| After 15 hours UV | .4 | F | F |
| Initial creep | 120 | 30 | 20 |
| After 10 hours UV | 120 | 35 | 25 |
| After 15 hours UV | 120 | 15 | 20 |
| Initial peel | 1,800-1,900 | 1,600-1,700 | 1,500-1,600 |
| After 10 hours UV | 1,800-1,900 | 1,650-1,750 | 1,600-1,700 |
| After 15 hours UV | 1,800-1,900 | 1,650-1,750 | 1,600-1,700 |

[1] This resin was prepared according to Example II.
[2] Failure.

Table IV demonstrates the superior performance of resins of this invention when used in hot melt adhesives.

TABLE IV.—HOT MELT ADHESIVE TESTS

| Resin tested | Percent b.w. | Polyethylene | Color of mix after 240 hrs. at 300° F. | Kraft to kraft (30 lb. stock) bond cooled to 0° C. |
|---|---|---|---|---|
| Example No. 2, M.P. 100° C | 50 | 50 | Water white | Fiber tear—no film failure. |
| Poly para tertiary butyl styrene, M.P. 100° C | 50 | 50 | do | Film breaks—no fiber tear. |
| Poly beta pinene, M.P. 100° C | 50 | 50 | do | Do. |
| 65% vinyl toluene-35% methyl styrene copolymer, M.P. 100° C | 50 | 50 | Marked yellowing | Do. |
| 50% styrene-50% para tertiary butyl styrene copolymer | 50 | 50 | Water white | Do. |

NOTE.—In above tests blends were hot melted to 350° C., cooled to 300° F., applied to 1 sheet kraft as 10 mil film and pressure joined at 10 lbs./in. Bonds formed instantly as filmed cooled. Bonded paper was then cooled and held 1 hr. at 0° C. then tested by pulling apart at 0° C.

What is claimed is:

1. A method of producing resinous copolymers comprising reacting (A) para tertiary butyl styrene and (B) diisobutylene in the presence of a Friedel-Crafts catalyst at a temperature ranging from about 0° C. to about 70° C. and recovering said resinous copolymers wherein the amount of (A) ranges from about 95% to about 55% and (B) ranges from about 5% to about 45%, based on the finished resin.

2. The method of producing resinous copolymers according to claim 1 wherein the reaction is performed in the presence of an inert organic solvent.

3. The method of producing resinous copolymers according to claim 2 wherein said solvent is at least one member selected from the class consisting of benzene, toluene, xylene, aromatic solvents prepared from petroleum, VM&P naphtha, mineral spirits and mixtures thereof.

4. The method of producing resinous copolymers according to claim 3 wherein said solvent is heptane.

5. The method of producing resinous copolymers according to claim 2 wherein said recovery is done by neutalization and steam distillation.

6. The method of producing resinous copolymers according to claim 2 wherein the Friedel-Crafts catalyst is a member of the group consisting of boron trifluoride, boron trifluoride etherate, phosphorous penta fluoride, aluminum chloride, aluminum bromide, stannic chloride, alkyl stannic chloride, vanadium oxychloride, vanadium chloride and mixtures thereof.

7. The method of producing resinous copolymers according to claim 6 wherein the Friedel-Crafts catalyst is boron trifluoride.

8. The method of producing resinous copolymers according to claim 6 wherein the amount of said catalyst varies from about 0.05% to about 1% based upon the weight of the monomers.

9. The method of producing resinous copolymers according to claim 6 wherein the amount of said catalyst is about 0.1% based on the weight of the monomers.

10. Resinous copolymers prepared in accordance with the process of claim 1 by reacting (A) para tertiary butyl styrene and (B) diisobutylene in the presence of a Friedel-Crafts catalyst at a temperature ranging from about 0° C. to about 70° C. and recovering said resinous copolymers; said resinous copolymers being colorless, having softening points up to about 140° C. and being soluble down to about 0° C. in odorless, low Kauri Butanol value solvents.

References Cited

UNITED STATES PATENTS

| 2,476,000 | 7/1949 | Sparks | 260—85.3 |
| 2,559,498 | 7/1951 | Garber | 260—82 |
| 2,723,261 | 11/1955 | Levine | 260—88.1 |
| 3,654,250 | 4/1972 | Davis | 260—88.2 C |

OTHER REFERENCES

Chemical Abstracts, vol. 17, 1970, 91650n, Waterproof Fibrous Material.

JAMES A. SEIDLECK, Primary Examiner

R. S. BENJAMIN, Assistant Examiner

U.S. Cl. X.R.

106—32; 156—334; 260—897 B & R, 892, 28.5 A